United States Patent [19]
Yoshida

[11] Patent Number: 5,144,115
[45] Date of Patent: Sep. 1, 1992

[54] TRANSACTION INQUIRING METHOD AND APPARATUS

[75] Inventor: Yasuhisa Yoshida, Owariasahi, Japan

[73] Assignee: Hi Tachi, Ltd., Tokyo, Japan

[21] Appl. No.: 641,725

[22] Filed: Jan. 15, 1991

[30] Foreign Application Priority Data

Jan. 29, 1990 [JP] Japan ................. 2-018666

[51] Int. Cl.$^5$ .............................................. G06F 15/30
[52] U.S. Cl. ..................................... 235/379; 364/408
[58] Field of Search ......................... 235/379; 364/408

[56] References Cited

U.S. PATENT DOCUMENTS 4,277,837 7/1981 Stuckert .............................. 235/379
4,634,845 1/1987 Hale et al. ............................. 235/379

*Primary Examiner*—John W. Shepperd
*Attorney, Agent, or Firm*—Antonelli, Terry, Stout & Kraus

[57] ABSTRACT

Transaction inquiry is carried out using a transaction inquiring apparatus comprising a card read/write section for reading/writing transaction information from/in an IC card, a display section for inputting designation of the information to be inquired and also displaying transition information retrieved, a line control device for communicating with a center office storing transaction information, a retrieval section for retrieving information out of the transaction information, and a control device for controlling these devices. The transaction inquiry is carried out along the process comprising the steps of inserting an IC card into the above apparatus, making an on-line transaction with a center office for an ATM (automatic teller machine) and writing in an IC card the information on transactions made until now on the account of an IC card owner which is held in the center office, designating the transaction information to be inquired, retrieving the designated transaction information out of the transaction information written in the IC card, and displaying the retrieved transaction information on a display screen.

8 Claims, 8 Drawing Sheets

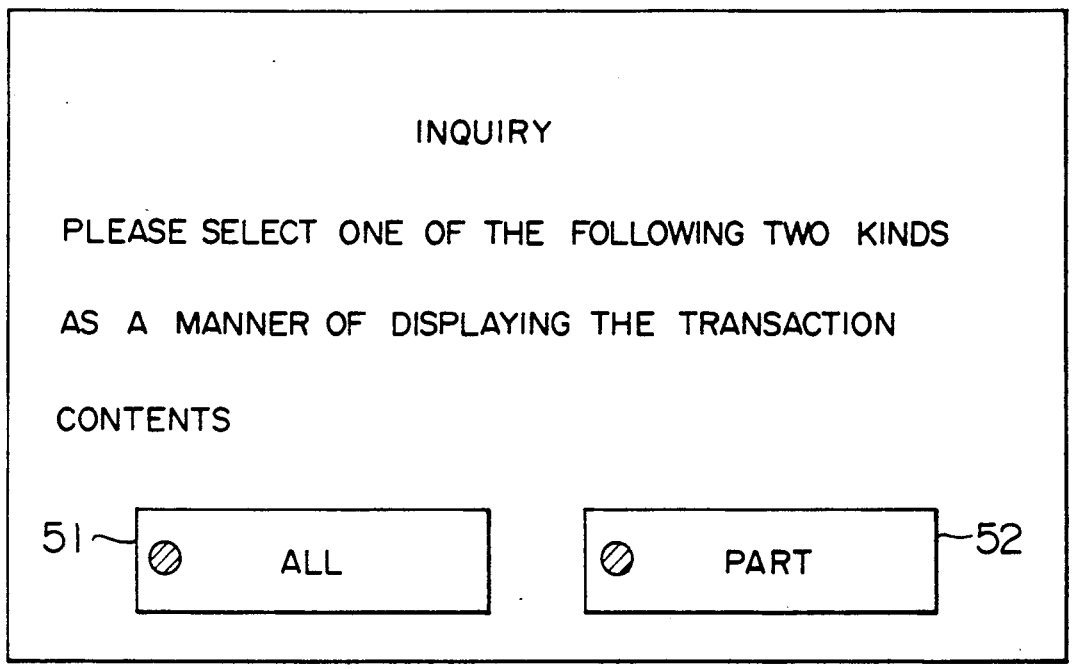

FIG. 7

PLEASE SELECT THE FOLLOWING MODE (S) AS DISPLAY OF A PART

71 — ⊘ PERIOD
73 — ⊘ DIRECT PAYMENT
72 — ⊘ DEPOSIT
74 — ⊘ PAYMENT

FIG. 8

PLEASE PERIOD TO BE INQUIRED

YEAR    MONTH ~    YEAR    MONTH

| 0 | 1 | 2 | 3 | 4 | 5 | 6 | 7 | 8 | 9 | 81 |

| INITIAL | FINAL | CORRECTION |
| 82 | 83 | 84 |

FIG. 9

SELECTION OF KIND OF DIRECT PAYMENT

PLEASE SELECT AT LEAST ONE OF THE FOLLOWING KINDS

- 905 — ⊘ ELECTRIC POWER
- 98 — ⊘ GAS
- 906 — ⊘ WATER
- 99 — ⊘ TELEPHONE
- 907 — ⊘ ALL KINDS

FIG. 10

CONTENTS INQUIRED ARE DISPLAYED         166 SELECTED SCENE

KIND: DIRECT PAYMENT, GAS    PERIOD  MARCH 1988 ~ FINAL

| DATE | PAYMENT | DEPOSIT | REMARKS | TOTAL |
|---|---|---|---|---|
| 88-03-27 | 3,542 | | GAS | 3,542 |
| 88-04-27 | 4,813 | | GAS | 8,355 |
| 88-05-27 | 2,933 | | GAS | 11,288 |

163 PREVIOUS PAGE   164 NEXT PAGE   165 END

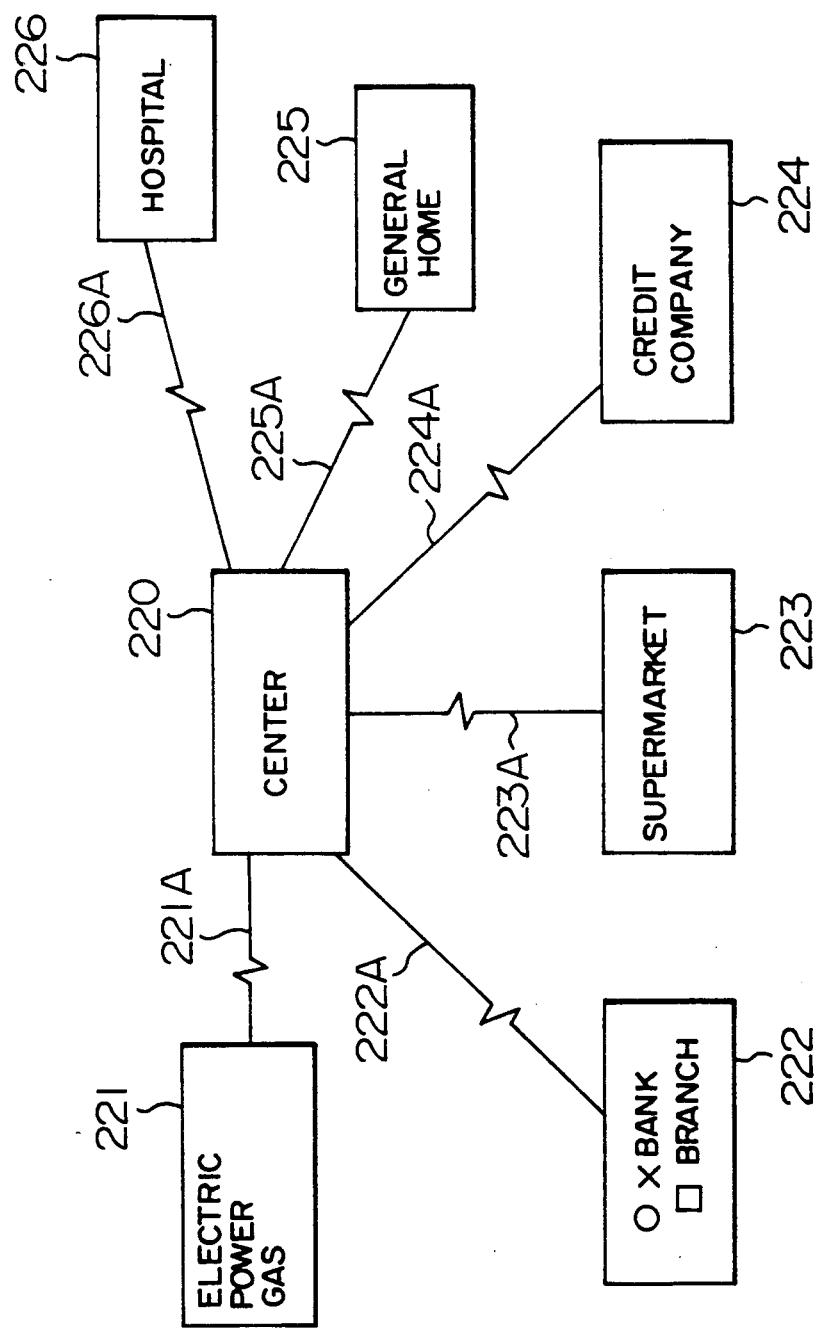

TRANSACTION INQUIRING METHOD AND APPARATUS

BACKGROUND OF THE INVENTION

The present invention relates to a transaction inquiring method and apparatus, and more particularly to a transaction inquiring method and apparatus which can retrieve information on a financial institution account using an IC card having a storage function through a retrieving method optionally selected irrespectively of on-line or off-line.

In conventional transaction inquiring method, a user stands before an ATM (automatic teller machine) to input a transaction inquiring requirement using a magnetic card, and inserts a pass-book to print out the transaction contents thereon by communicating with a transaction center. Further, the transaction processing apparatus as disclosed in JP-A-60-262276 displays only non-entry data on the display screen of ATM and also displays the transaction contents sent from the transaction center only in an on-line transaction, i.e. necessarily communicating with the transaction center. Thus, the conventional transaction inquiring methods cannot inquire for the transaction contents in an off-line transaction. Further, in a financial institution, a user cannot inquire for the transaction contents using only a magnetic card, i.e. without using a passbook on which entry of the transaction contents is to be made.

Accordingly, the conventional transaction inquiring apparatus have a problem that it does not take the inquiry during the off-line transaction into consideration and also can only make the display or entry of non-entry data but cannot retrieve necessary information from all the transaction data.

SUMMARY OF THE INVENTION

In view of the above problem, an object of the present invention is to provide a transaction inquiring method and apparatus which can retrieve necessary information on a user's account and display the transaction data for the user in his off-line transaction.

Another object of the present invention is to provide a transaction inquiring method and apparatus which can retrieve necessary transaction information and shorten the time taken to access to the information required by a user.

In order to attain the above objects, the transation inquiring method according to the present invention comprises the steps of inserting an IC card into an ATM (automatic teller machine), making an on-line transaction with a center office for the ATM and writing in an IC card the information on transactions made until now on the account of an IC card owner which is held in the center office, designating the transaction information to be inquired, retrieving the designated transaction information out of the transaction information written in the IC card, and displaying the retrieved transaction information on a display screen.

Further, the transaction inquiring method according to the present invention comprises the steps of registering the information on transactions of an owner of an IC card in a transaction center, connecting the IC card with a terminal device, communicating the terminal device with a transaction center through online to write the transaction information registered in the transaction center in the IC card, designating the transaction information to be inquired from the input unit of the terminal device, retrieving the designated transaction information out of the transaction information written in the IC card, and outputting the retrieved transaction information from a printer connected with the terminal.

The transation inquiring apparatus according to the present invention comprises card read/write means for reading/writing transation information from/in an IC card, input means for inputting designation the information to be inquired, retrieval means for retrieving information out of the transaction information on the basis of the designation by the input means, display means for displaying the retrieved transaction information, communication means for communicating with a center office storing the transaction information, and control means for controlling these means in such a manner that the card read/write means writes in the IC card the transaction information stored in the center office sent through the communication means, the retrieval means retrieves the information designated through the input means, and the display means displays the retrieved information.

In accordance with the present invention, an IC card having a storage function is used to previously store the information on an account. The information stored is read from the IC card, and the information on the account is displayed for a user through a retrieval device. If the retrieval device is an ATM, the card is inserted to select the retrieval method in accordance with the induction guidance.

The present invention includes the following aspects of (a) inquiry after an on-line transaction through ATM, (b) inquiry after an off-line transaction through ATM, (c) displaying the information stored in an IC card on a display screen of a household terminal device (television, word-processor, etc.), (d) displaying the information stored in the IC card on a display screen provided on the IC card, and (e) storing in the IC card the information sent from a general transaction center.

Thus, the information on an account is displayed also in an off-line transaction, and only necessary data is displayed through the retrieval means.

BRIEF DESCRIPTION OF THE DRAWINGS

These and other object and advantages of the present invention will become apparent by reference to the following description and accompanying drawings wherein:

FIG. 5 is a view showing a first mode selection screen in the inquiry display method according to the present invention;

FIG. 6 is an example of display when display of all transactions is selected;

FIG. 7 is a view showing a second mode selection screen for display of a part of the transactions;

FIG. 8 is a view of a third mode selection screen by period designation;

FIG. 9 is a view of a third mode selection screen for bank transfer payment;

FIG. 10 is an example of display of payment of a gas charge;

FIG. 12 is a connection diagram of an application system showing another embodiment of the present invention;

DESCRIPTION OF THE PREFERRED EMBODIMENTS

Figure 1:
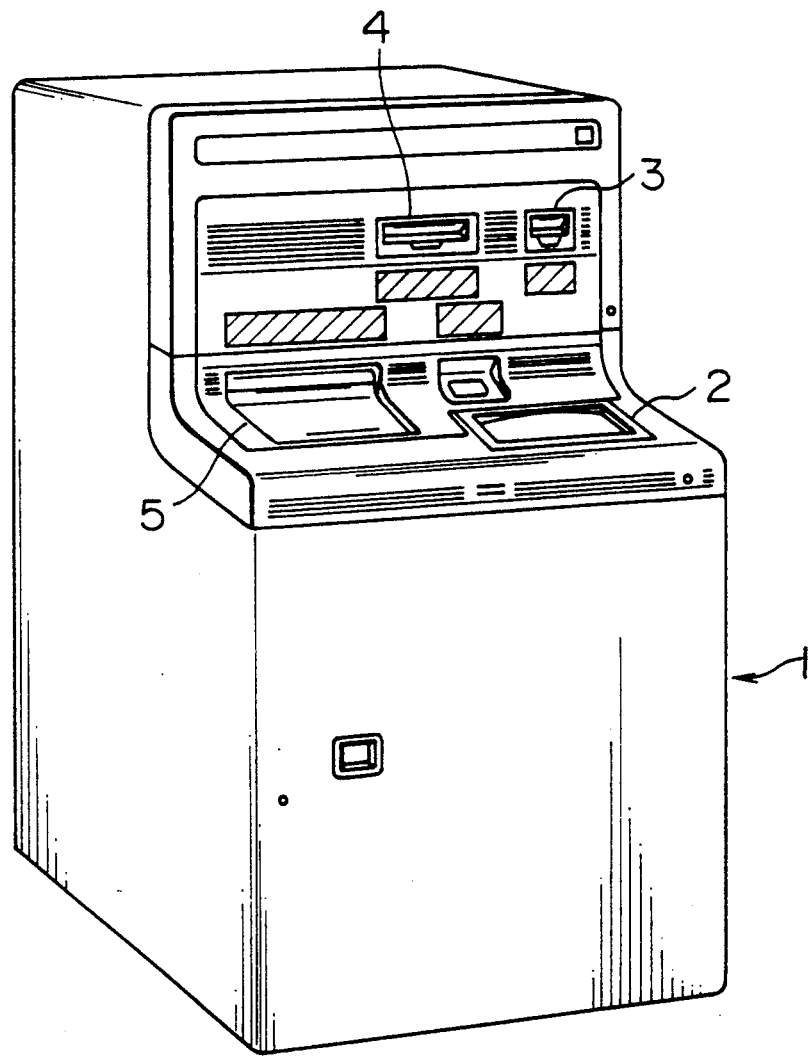
FIG. 1 is a perspective view of an ATM (automatic teller machine) according to an embodiment of the present invention.

Now referring to the drawings, preferred embodiments of the present invention will be explained below.

FIG. 1 is a perspective view of the ATM according to an embodiment of the present invention. In FIG. 1, ATM 1 comprises, on its operation face, a display section 2 of a touch panel from which data can be input, an IC card reader/writer 3 for taking in an IC card and reading/writing the data from/in the IC card, a statement/ passbook printing section 4 for taking in a passbook to print transaction contents in the passbook and print a statement slip, and a bill recycle module 5 for recycling bills.

Figure 2:
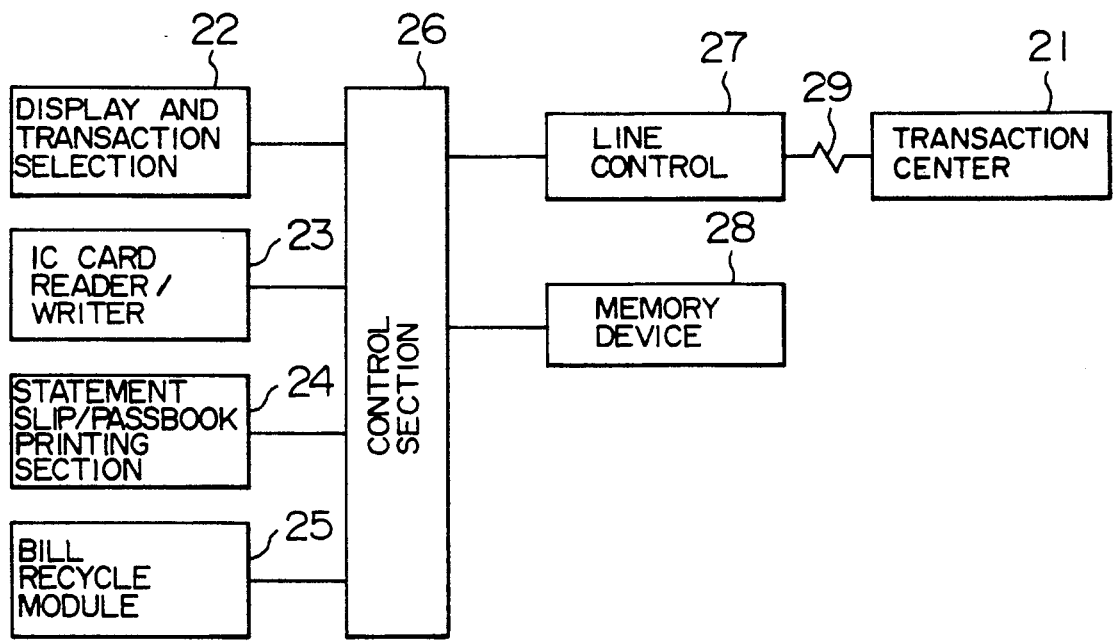
FIG. 2 is a flowchart showing the process for controlling the ATM of FIG. 1.

FIG. 2 is a block diagram showing the manner of controlling the ATM 1 of FIG. 1. A control section 26 incorporated in ATM 1 serves to control a display and transaction selection section 22, an IC card reader/writer section 23, a statement-slip/passbook printing section 24 and a bill recycle module section 25. The control section 26 also serves to control a memory device 28 so that necessary information can be stored and necessary information is retrieved out of the stored information. The control section 26 is connected with a transaction center 21 through a line control section 27 and a line 29 whereby the data held in the transaction center 21 are exchanged and controlled. The transaction center 21 holds the information on the deposit/payment relative to an account at issue and also on the bank transfer payment of charges on electric power, water, gas, telephone, etc. from the account.

Figure 3:
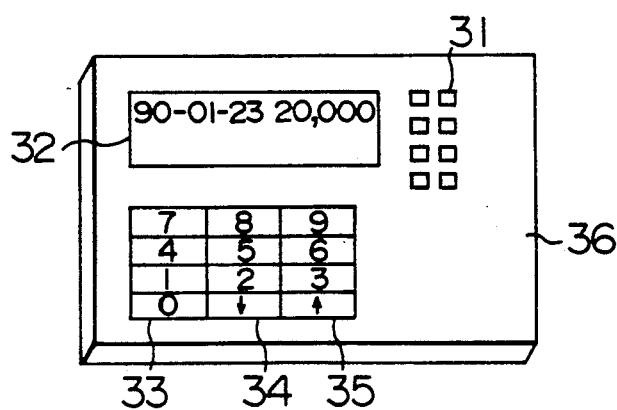
FIG. 3 is a perspective view of an IC card according to an embodiment of the present invention.

FIG. 3 shows an IC card 36 used in the ATM as shown in FIG. 1. As seen from FIG. 3, located on the upper surface of the IC card 36 are contacts 31 which are brought into contact with the corresponding contacts of the ATM to read/write information, a display section 32 for displaying transaction information, a ten-key pad 33 for inputting numbers of 0 to 9, and scroll keys 34 and 35 for scrolling the information displayed on the display unit 32. Although in FIG. 3, the IC card is shown to have the display section, the IC card with no display section may be used in the present invention.

Figure 4:
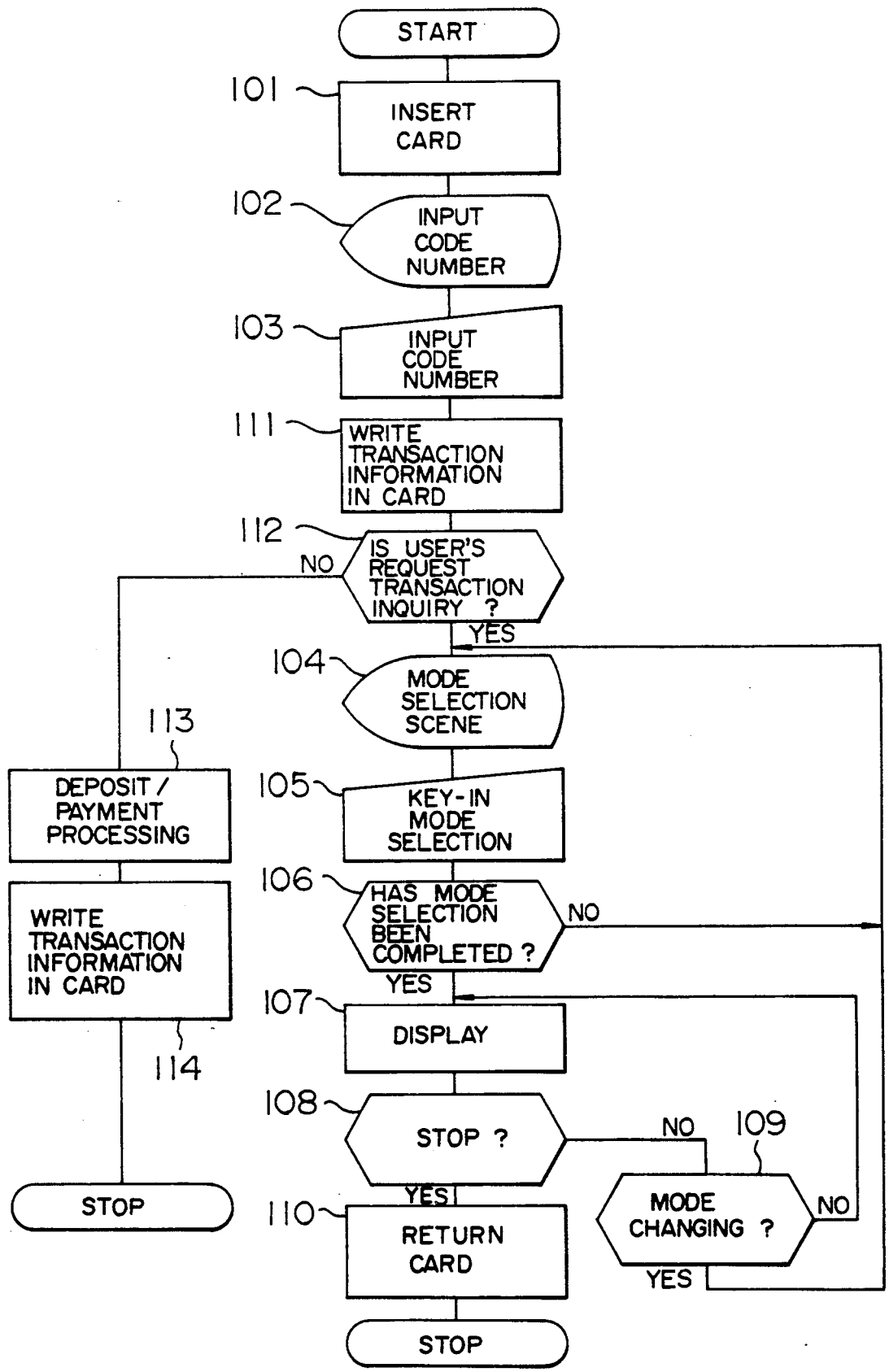
FIG. 4 is a flowchart of the transaction inquiring process according to an embodiment of the present invention.

FIG. 4 is a flowchart of the transaction inquiry process according to one embodiment of the present invention.

Explanation will be given for a first aspect thereof in which a bank transaction (on-line transaction) is made using an IC card through an ATM. Transaction contents are inquired to previously store in an IC card the information on an account at issue such as transaction data held in the transaction center 21.

The transaction contents are inquired using the IC card as follows. First, the IC card 36 as shown in FIG. 2 is inserted into the IC card reader/writer section 23 of the ATM 1 (Step 101). Then, "Please input your code number" is displayed on the display section 2 of the ATM (Step 102). An IC card owner (user) inputs his code number from the display and transaction selection section (touch panel) 2 (Step 103). The terminal device such as ATM compares the input code number with the code number stored in the IC card 36 to identify the user. If the card owner is identified, the ATM 1 accesses the transaction center 21 through the line control section 27 and causes the transaction center to forward the transaction information on the account of the card owner made until now held in the transaction center. This transaction information is stored or written in the IC card through the card reader/writer section 2 (Step 111).

After completion of writing, the ATM causes the display section 2 to display if or not the user's request is transaction inquiry so that the user selects either 'transaction inquiry' or normal transaction (deposit/payment operation) (Step 112). If the answer in Step 112 is 'No', the ATM performs the normal deposit/payment operation (Step 113), and stores the transaction content in the IC card (Step 114). Thus, the bank transaction process is ended.

On the other hand, if the answer in Step 112 is 'Yes' (i.e. 'transaction inquiry' is selected), the process for the transaction inquiry will be carried out.

This inquiry process is characterized in that the transaction information stored in the IC card or the memory section of the ATM is retrieved by the control section 26 of the ATM.

First, a mode selection scene is displayed on the display section 2 (Step 104).

FIGS. 5 to 9 are display screens on which necessary directions can be given by touching; specifically, FIGS. 5 and 7 to 9 are screens for mode selection.

A first mode selection scene as shown in FIG. 5 is adapted to select one of two modes for transaction inquiry. Specifically, if the user desires that all transactions are displayed, he touches '●all' 51 whereas he desires that a part of transactions is displayed, he touches '●part' 52.

Assuming that '●all' is touched in the flowchart of FIG. 4 (Step 105), all the transactions made until now will be displayed so that the mode selection step is ended (Step 106). Thus, as shown in FIG. 6, the scene exhibiting the transaction data from opening the user's account up to now is displayed (Step 107). Specifically, the transaction information forwarded from the transaction center and stored in the IC card in Step 111 is read out and displayed on the display section of the ATM. If all items of transaction information cannot be displayed on a single scene, 'next page' 64 is pressed to display the transaction information included in the next page; and 'previous page' 65 is pressed to display that included in the previous page. If 'End' is touched (Step 108), the display is terminated, even if it has not yet completed, to return the IC card to the user (Step 110). If 'selection scene' is pressed in Step 108, the inquiry process is not ended but returned to the first mode selection scene as shown in FIG. 5 one screen before (Step 109).

If part '●part' 52 is pressed on the scene as shown in FIG. 5, the inquiry process is shifted to a second mode selection scene for selection of a detailed mode as shown in FIG. 7. The scene of FIG. 7 is adapted to designate '●period' 71, '●deposit' 72, '●bank transfer payment' 73, and '●payment' 74. Now if 'period', 'deposit' and/or 'payment' are designated, the inquiry process is shifted to a third mode selection scene as shown in FIG. 8. This scene is adapted to designate the period to be inquired. Specifically, this intends to limitedly display the deposit and payment during a certain period when 'deposit' and 'payment' are selected as well as when 'period' is selected. It should be noted that if 'bank transfer payment' is selected, the period is designated after the kind of the bank transfer payment is designated.

As shown in FIG. 8, the above period can be input using a ten-key pad 81; otherwise if the inquiry from opening the user's account is desired, 'initial' 82 is pressed and if the inquiry until the last transaction is desired, 'last' 83 is pressed. If the number in the ten-key pad 81 is erroneously pressed, 'correction' 84 is pressed and thereafter a correct number is pressed again.

Accordingly, there are four ways of designating the period; both of the start and end of inquiry are input using the ten-key pad 81; the former is input using the 'initial' 82 whereas the latter is input using the ten-key pad 81; the former is input using the ten-key pad 82 whereas the latter is input using the 'last' 83; and the former is input using the 'initial' whereas the latter is input using the 'last' 83. When the inquiry period is designated, the mode selection step is completed (Step 106). Thus, only the deposit, only the payment or all the transactions during the designated period is displayed in accordance with the contents designated on the screen shown in FIG. 7.

Now if the 'automatic payment' 73 is selected on the scene of FIG. 7, the inquiry process is shifted to the fourth mode selection scene as shown in FIG. 9. This scene exhibits the kinds of transaction to which automatic payment is being subjected and urges the user to designate at least one kind of transaction from the transactions displayed. Now if one transaction e.g. '● gas' 98 is selected among '● electricity' 95, '● water' 96, '● all kinds' 97, '● gas' 98 and '● telephone' 99, the inquiry process is shifted to the third mode selection screen as shown in FIG. 8. Thus, the period to be inquired is designated as described above. If the period from March 1988 to the last transaction is designated, only the transactions of bank transfer payment during the period are displayed on the screen as shown in FIG. 10. Although the respective keys of 'previous page' 163, 'next page' 164 'end' 165 and 'selection screen' 166 are located also on the scene of FIG. 10, their function have been explained in connection with FIG. 6.

The above explanation has been made of the embodiment where in a bank transaction with an IC card owner, an ATM writes in his IC card the information of his deposition/payment transaction relative to his account and the information on the account at issue such as automatic payment held in a transaction center and forwarded therefrom, and inquires these items of information in a way of displaying them on the display screen of the ATM. In accordance with the present invention, the transaction information is previously stored in the IC card so that the ATM which is in off-line with the transaction center can inquires the transaction information.

Instead of the ATM, the household terminal devices such as a personal computer, a word processor, etc. can be used to inquire for transaction information. Further, by providing an IC card with a display section and a function of retrieval, the transaction information can be inquired for through the display section of the IC card. These examples of the transaction inquiry will be explained in detail.

(1) Inquiry in off-line

Also when the ATM and the transaction center are in off-line from each other, the inquiry process is substantially the same as that in on-line except that in the flowchart of FIG. 4, the steps (Steps 111 and 114) of writing the transaction information in the IC card are omitted. Specifically, the transaction information is stored in the IC card so that the IC card reader/writer of the ATM reads out this information, and the control section retrieves the transaction information in accordance with designated by an IC card owner; the retrieved transaction information is displayed on the display section of the ATM.

Additionally, also in the case where the IC card is provided with a display screen as described later, it is preferable to use a relatively large scale display screen of the ATM. This is because the display screen of the IC card can display usually only one or two lines but not the entire information.

(2) Inquiry using household terminal devices

An explanation will be given of the transaction inquiry using household terminal devices such as a personal computer, a word processor, the screen of a television connected with the personal computer.

Figure 11:
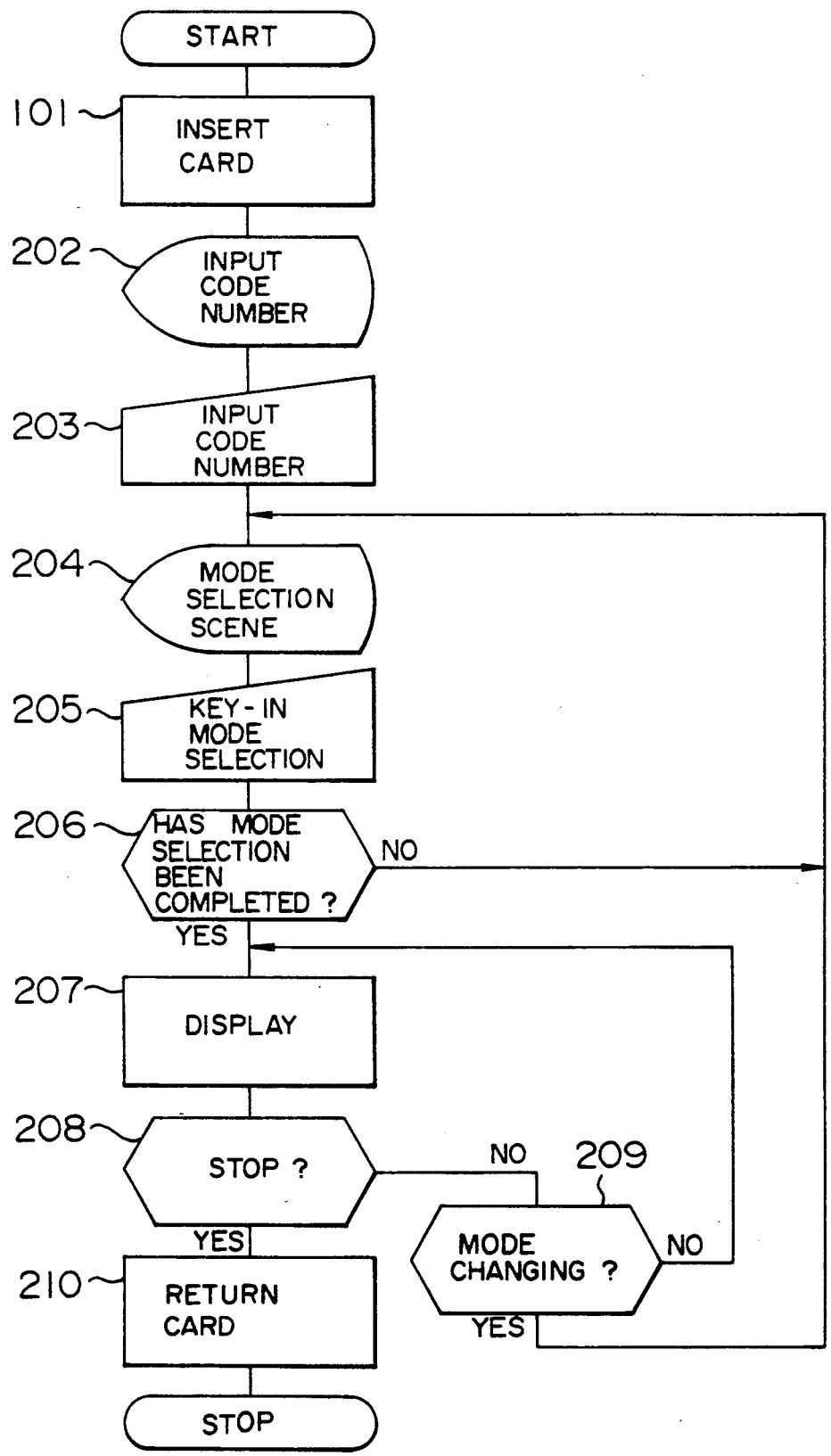
FIG. 11 is a flowchart of the transaction inquiring process using a household terminal device.

A personal computer (not shown) is previously programmed to execute the processings according to the flowchart of FIG. 11. A card reader for reading the information stored in an IC card and inputting it to the personal computer is connected with the personal computer.

The IC card stores the transaction information forwarded from a transaction center in the transaction by the ATM. First, this IC card is inserted into the card reader (Step 201). Then, "please input your code number" is displayed on the display screen of the personal computer (Step 202). An IC card owner (user) inputs his code number from the input section (keyboard) of the personal computer (Step 203). The personal computer compares the input code number with the code number stored in the IC card to identify the user. If the card owner is identified, the personal computer is permitted to access the information stored in the IC card. The succeeding processings (Steps 204 to 210) are substantially the same as those (Steps 104 to 110). Thus, the scenes explained in connection with FIGS. 5 to 10 will be displayed on the display screen of the personal computer.

The transaction inquiry according to this example save a great deal of time since the user is not required to go the place where the ATM is located.

(3) Transaction inquiry using the display screen of an IC card.

An explanation will be given of the inquiry or retrieval of transaction information using the display screen of the IC card. The IC card according to the one embodiment of the present invention is provided with the display section 32 as shown in FIG. 3. The IC card is also provided, in its inside, with a memory section for storing transaction information and a control section for controlling the display section and the memory. The control section controls the memory section and the display section so that necessary information of the transaction information stored in the memory section is retrieved in accordance with designation from the ten-key pad 33 and the retrieved information is displayed on the display section. By scrolling the displayed scene by the scroll keys 34 and 35, the entire contents of the retrieved information can be eventually displayed. Designation of the transaction information and processing (e.g. mode selection) of the displayed scene can be performed in the same manner as in the embodiment described with reference to the flowchart of FIG. 4.

The method according to this example permits transaction information to be inquired for at any place such as at the user's home, work place, and on the load, etc.

Another embodiment of the present invention will be explained referring to FIG. 12. In the previous embodiment, the transaction information on bank accounts is registered in the transaction center. On the other hand, in this embodiment, a synthetic transaction center 220 is located to register all items of information on the transactions including daily shopping, a business deal as well as the transaction information on bank accounts. All the items of information are written in an IC card which can communicate with the synthetic transaction center by on-line. The card owner can inquire necessary information by retrieving the information stored in the IC card and also print out the retrieved information using the printer connected with the terminal device.

FIG. 12 is a connection diagram of the application system according to this embodiment. As seen from FIG. 12, located around a synthetic transaction center 220 are a system 221 for an electric power company, gas company, etc. a terminal 222 for each bank, a POS (point of sale) system 223 for a supermarket, a system 224 for a credit company, a terminal 225 such as a personal computer of home banking, and a hospital system 226; these systems are connected with the synthetic transaction center through their corresponding dedicated lines 221A to 226A.

If an IC card owner buys goods at a supermarket 223, or receives medical service at a hospital 226, for example, the information on such a transaction is transmitted to the center 220 to store therein from the terminal of that institution. When the card owner uses the IC card for transaction, this information is forwarded from the center 220 and stored in the IC card. Specifically, when the card owner uses the ATM of a bank 222, for example, all the items of transaction information are forwarded through the line 222A and stored in the IC card in the same manner as that described in connection with the flowchart of FIG. 4.

Thus, the IC card owner can inquire for necessary information of the stored information using the ATM of a bank, a household terminal device in his home in such a manner that the necessary information is retrieved and displayed on the screen of the terminal. If the card owner uses the IC card having a function of display, he has only to use the IC card to inquire for the necessary transaction information.

Further, the above retrieved information can be printed out by the printer connected with the terminal such as an ATM and a household terminal device. Thus, the household account book can be automatically kept. Specifically, the terminal is used to retrieve the shopping at a supermarket and/or buying on credit; the retrieved information can be output by a printer to keep the household account book. Further, only the medical expenses paid at a hospital may be retrieved; the paper with the printed-out information can be used as the data for receiving medical reduction for tax. The printer may be installed in the user's home and also at the user's work place for common use.

Although the retrieved information is printed out using a printer in this embodiment as described above, it is needless to say that the printer can be used also in the previous embodiment explained in connection with FIG. 4. In the case where an ATM is used for transaction inquiry, the statement-slip/passbook printing section can be used as a printer. Further, not only the IC card employed in the embodiments described above, but also any card such as a magnetic card, an optical card, etc. may be used as long as it can store data.

While particular embodiments of the present invention have been shown and described, it will be obvious to those skilled in the art that various changes and modifications may be made without departing from the present invention in its broader aspects.

I claim:

1. A transaction inquiring method comprises the steps of:
   inserting an IC card into an ATM (automatic teller machine);
   making an on-line transaction with a center office for the ATM and writing in an IC card the information on transactions made until now on the account of an IC card owner which is held in the center office;
   designating the transaction information to be inquired;
   retrieving the designated transaction information out of the transaction information written in the IC card; and
   displaying the retrieved transaction information on a display screen.

2. A transaction inquiring method according to claim 1, wherein said transaction information is designated by the input section of the ATM, and said retrieved transaction information is displayed on the display section of the ATM.

3. A transaction inquiring method according to claim 1, wherein in an on-line state of said ATM with said center, the transaction information is written in the IC card; and in an off-line state of said ATM with said center office, the transaction information to be inquired is designated, the designated transaction information is retrieved out of the transaction information written in the IC card, and the retrieved transaction information is displayed on the display screen.

4. A transaction inquiring method according to claim 1, further comprising the step of connecting the IC card having the transaction information stored therein by the ATM with a household terminal device through a connection device, wherein said transaction information is designated by the input section of said household terminal device, and said retrieved transaction information is displayed on the display section of the household terminal device.

5. A transaction inquiring method according to claim 1, said transaction information is designated by the input section of said IC card, and said retrieved transaction information is displayed on the display section of the IC card.

6. A transaction inquiring method according to claim 1, further comprising the step of outputting the retrieved information from a printer.

7. A transaction inquiring method comprising the steps of:
   registering the information on transactions of an owner of an IC card in a transaction center;
   connecting the IC card with a terminal device;

communicating the terminal device with a transaction center through on-line to write the transaction information registered in the transaction center in the IC card;

designating the transaction information to be inquired from the input unit of the terminal device;

retrieving the designated transaction information out of the transaction information written in the IC card;

and outputting the retrieved transaction information from a printer connected with the terminal.

8. A transaction inquiring apparatus comprising:

card read/write means for reading/writing transaction information from/in an IC card;

input means for inputting designation the information to be inquired;

retrieval means for retrieving information out of the transaction information on the basis of the designation by the input means;

display means for displaying the retrieved transaction information;

communication means for communicating with a center office storing the transaction information; and control means for controlling these means in such a manner that the card read/write means writes in the IC card the transaction information stored in the center office sent through the communication means, the retrieval means retrieves the information designated through the input means, and the display means displays the retrieved information.

* * * * *